(12) United States Patent
Teller et al.

(10) Patent No.: US 8,342,928 B1
(45) Date of Patent: Jan. 1, 2013

(54) MARKET-BASED SIMULATION GAME AND SYSTEM

(75) Inventors: Chuck Teller, Berkeley, CA (US); Tim Murphy, Berkeley, CA (US); John Cunningham, Saratoga, CA (US)

(73) Assignee: Realius, Inc., Berkeley, CA (US)

( * ) Notice: Subject to any disclaimer, the term of this patent is extended or adjusted under 35 U.S.C. 154(b) by 1072 days.

(21) Appl. No.: 12/130,447

(22) Filed: May 30, 2008

Related U.S. Application Data (60) Provisional application No. 60/941,604, filed on Jun. 1, 2007.

(51) Int. Cl.
*A63F 9/24* (2006.01)

(52) U.S. Cl. ............................................. 463/9; 463/42

(58) Field of Classification Search ................ 463/9, 42; 700/91, 92, 93; 705/1.1
See application file for complete search history.

(56) References Cited

U.S. PATENT DOCUMENTS

| | | | |
|---|---|---|---|
| 4,840,382 A | | 6/1989 | Rubin |
| 5,361,201 A * | | 11/1994 | Jost et al. .......................... 705/35 |
| 5,414,621 A * | | 5/1995 | Hough ........................... 705/7.34 |
| 6,178,406 B1 * | | 1/2001 | Cheetham et al. ........... 705/7.34 |
| 6,609,109 B1 * | | 8/2003 | Bradley et al. .................. 705/35 |
| 6,609,118 B1 * | | 8/2003 | Khedkar et al. ............. 705/36 R |
| 6,634,950 B2 | | 10/2003 | Yoshimi et al. |
| 6,773,350 B2 | | 8/2004 | Yoshimi et al. |
| 6,876,955 B1 * | | 4/2005 | Fleming et al. ................ 702/194 |
| 7,729,965 B1 * | | 6/2010 | An et al. .......................... 705/35 |
| 2002/0013762 A1 | | 1/2002 | Yoshimi et al. |
| 2002/0087389 A1 * | | 7/2002 | Sklarz et al. ..................... 705/10 |
| 2002/0187827 A1 * | | 12/2002 | Blankstein ....................... 463/20 |
| 2003/0212565 A1 * | | 11/2003 | Badali et al. ........................ 705/1 |
| 2004/0073508 A1 * | | 4/2004 | Foster et al. ...................... 705/38 |
| 2005/0154657 A1 * | | 7/2005 | Kim et al. ......................... 705/30 |
| 2005/0197889 A1 * | | 9/2005 | Prigogin et al. ................. 705/10 |
| 2006/0217994 A1 * | | 9/2006 | Gardner et al. ................... 705/1 |
| 2006/0218179 A1 * | | 9/2006 | Gardner et al. ............... 707/102 |
| 2006/0271472 A1 * | | 11/2006 | Cagan ............................. 705/38 |
| 2006/0293915 A1 * | | 12/2006 | Glenn et al. ....................... 705/1 |
| 2007/0106523 A1 * | | 5/2007 | Eaton et al. ........................ 705/1 |
| 2007/0185906 A1 * | | 8/2007 | Humphries et al. ........ 707/104.1 |
| 2007/0198278 A1 * | | 8/2007 | Cheng et al. ...................... 705/1 |
| 2008/0077458 A1 * | | 3/2008 | Andersen et al. ................. 705/7 |
| 2008/0125227 A1 * | | 5/2008 | Bui et al. ......................... 463/42 |

(Continued)

OTHER PUBLICATIONS

"A Salute to Game Shows—The Price is Right" published on or before Jan. 31, 2003 and retrieved from URL <http://web.archive.org/web/20030904230345/http://www.chris-place.com/game-shows/shows/price-is-right/> on Feb. 6, 2012, 47 pages.*

(Continued)

*Primary Examiner* — William Brewster
*Assistant Examiner* — Jason Skaarup
(74) *Attorney, Agent, or Firm* — Steven R. Vosen (57) ABSTRACT

Games and devices for playing games based on market simulations are described. The games may use real market data or may simulate markets using real data. Other games may use guesses from a large number of other players to simulate the market. One embodiment is described where real estate markets are the basis for a game. The value of the real estate may be determined by actual sales prices or valuations, by automated valuation models of the sales or valuation of similar items, or from a "wisdom of the crowd" algorithm. In one embodiment, the wisdom of the crowd algorithm uses a segmented authority model to make the pricing algorithm more robust.

19 Claims, 6 Drawing Sheets

U.S. PATENT DOCUMENTS

2008/0154827 A1* 6/2008 Connors .................. 706/46

OTHER PUBLICATIONS

"What's a Zestimate?" published on or before Apr. 6, 2007 and retrieved from URL <http://web.archive.org/web/20070406191641/http://www.zillow.com/howto/Zestimate.htm> on Feb. 1, 2012, 5 pages.*

"Speed Interactive Fantasy Bid Game Nominated for Cablefax Best of Web Award" written by Barrett Jackson, published Mar. 11, 2010, and retrieved from URL <http://news.barrett-jackson.com/speed%E2%84%A2-interactive-fantasy-bid-game-nominated-for-cablefax-best-of-web-award/>, 2 pages.*

"Speedtv.com Scores Record Traffic Day" written by Barrett Jackson, published Jan. 24, 2007, and retrieved from URL<http://news.barrett-jackson.com/speedtv-com-scores-record-traffic-day/>, 1 page.*

\* cited by examiner

MARKET-BASED SIMULATION GAME AND SYSTEM

CROSS-REFERENCE TO RELATED APPLICATIONS

This application claims the benefit of U.S. Provisional Application No. 60/941,604, filed Jun. 1, 2007, the entirety of which is incorporated herein by reference.

BACKGROUND OF THE INVENTION

1. Field of the Invention

The present invention generally relates to games and apparatus that simulate markets, and more particularly to a game and apparatus for simulating and predicting real and/or imaginary markets.

2. Discussion of the Background

Many games exist that simulate some part of real-world-like markets. Thus, for example, games such as Monopoly use fictitious properties and determine the value of the properties according to the rules of the game. Other games, such as fantasy baseball let players manage imaginary baseball teams based on the real-life performance of baseball players, and compete against one another using those players' statistics to score points. Yet other games allow players to guess the value of intangible items, such as real estate. While each of these games has its attraction, there is a disconnect between playing the game and the real world market it attempts to simulate.

There is currently no game that permits the players to interactively play a market-based game based on the value of high-value items using real or simulated market data. Such a game would be more compelling than other games, since it would more interactive and would more accurately simulate the real-world market.

DETAILED DESCRIPTION OF THE INVENTION

The present invention overcomes the disadvantages of the prior art by providing games that are more interactive and, alternatively, incorporate real world data from actual and/or imaginary markets.

In certain embodiments a game for one or more players is provided, where the game is based on the simulation of a value of a high-value asset (HVA). The game includes: determining a value of the HVA; accepting a guess of the value from a first player of the one or more players; and calculating a score corresponding to the deviation of the guess from the value.

In certain embodiments an apparatus containing a processor programmed to carry out a method of playing a game for one or more players is provided, where the game is based on the simulation of a value of a high-value asset (HVA). The method includes: determining a value of the HVA; accepting a guess of the value from a first player of the one or more players; and calculating a score corresponding to the deviation of the guess from the value.

In certain other embodiments a game for one or more players is provided, where the game is based on the simulation of a value of a HVA selected from a plurality of HVAs. The game includes: determining a value of the HVA with a valuation model; accepting a guess of the value from a first player of the one or more players; and calculating a score corresponding to the deviation of the guess from the value. The game further includes storing prior play information related to specific previous plays of the game, where the prior play information includes a player identification, the HVA, and two or more of the value, guess, or score. The valuation model provides a value that depends on the prior play information.

In certain embodiments a game for a plurality of players is provided, where the game is based on the simulation of a value of an item. The game includes the steps of: providing a guess of the value of the item, where the guess is provided by each player of the plurality of players; and receiving a score indicative of the difference between the value and the guess of the value. In one embodiment, the simulation includes calculating an authority for each player, where the authority may be segmented by item.

In certain other embodiments a game for a plurality of players is provided, where the game is based on the simulation of a value of an item. The game comprising the steps of providing a guess of the value of the item, where the guess is provided by each player of the plurality of players; and receiving a score indicative of the difference between the value and the guess of the value, where the value varies with the guess and score of the plurality of players.

In certain embodiments, a method is provided for a game for a plurality of players, where the game is a simulation of the real estate market for a specific property, the method comprises relying on data about the specific property, including photos, map location and description of the property as well as information of related properties to determine the value of the property.

These features together with the various ancillary provisions and features which will become apparent to those skilled in the art from the following detailed description, are attained by the simulations, games, and apparatus of the present invention, preferred embodiments thereof being shown with reference to the accompanying drawings, by way of example only, wherein:

Reference symbols are used in the Figures to indicate certain components, aspects or features shown therein, with reference symbols common to more than one Figure indicating like components, aspects or features shown therein.

DETAILED DESCRIPTION OF THE INVENTION

Described herein are certain embodiments for simulating a real or imaginary market for tangible items over a computer network, over mobile phone network or in print. Although certain preferred embodiments and examples for residential real estate are disclosed below, it will be understood by those skilled in the art that the present invention extends beyond the specifically disclosed embodiments to other alternative embodiments and/or uses of the invention and obvious modifications and equivalents thereof.

In general, the methods and apparatus of the present invention may be directed to any tangible item. In certain embodiments, the tangible item is a "high-value asset" (HVA). HVAs are understood to be items whose value may, but is not required to, increase over time as a result of the scarcity and/or desirability of owning the item. In some embodiments, such items are not frequently bought or sold, making it difficult to assess their value. Examples of HVAs include, but are not limited to, real estate, jewelry, coins, collectible items, art, memorabilia, and luxury items.

Figure 1:
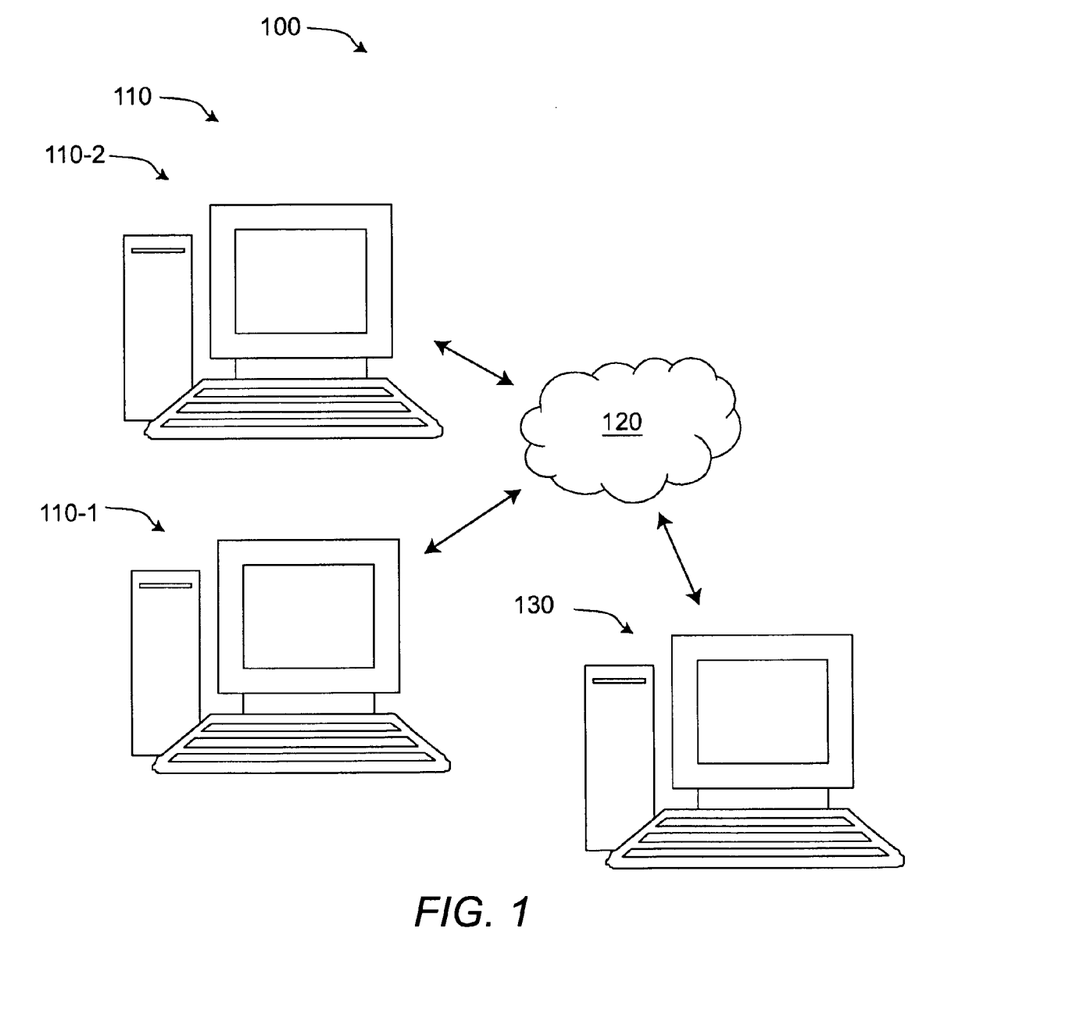
FIG. 1 is a schematic of a system for performing simulations or providing games.

FIG. 1 is a schematic of one embodiment of a system 100 for performing games that include market-based simulations of the value of a tangible item (referred to herein, without limitation as an "item" or a "property"). In the embodiment of FIG. 1, system 100 includes one or more devices 110 for use by individual users of the system (referred to herein, without limitation, as "players") that may be connected over network 120 to a simulation system 130 that may include one or more computers and/or storage devices. Simulation system 130 provides web services to devices 110 that permit players to engage in market-based simulations or games that include market-based simulations.

Simulation system 130 includes programmable devices that may: 1) provide information to one or more players regarding market-based simulations; and 2) receive input from individual ones of the plurality of devices to enable players to play games and/or run simulations. The information provided by simulation system 130 may be displayed on individual ones of the plurality of devices 110 as web pages, and alternatively, may provide a result of playing a market-based simulation game or information used by individual ones of the plurality of devices to display such results. In one embodiment, network 120 is a computer network that may be, but is not limited to, one or more of an intranet, wireless network and/or the Internet.

Devices 110 which may be an electronic devices accessible to a player, including but not limited to, desktop computers, laptop computers, personal digital assistants, terminals, cell phones, or a multitude of other network-connectable devices. For illustrative purposes which are not meant to limit the scope of the present invention, FIG. 1 shows two devices 110 (110-1 and 110-2) which are desktop computers.

Figure 2:
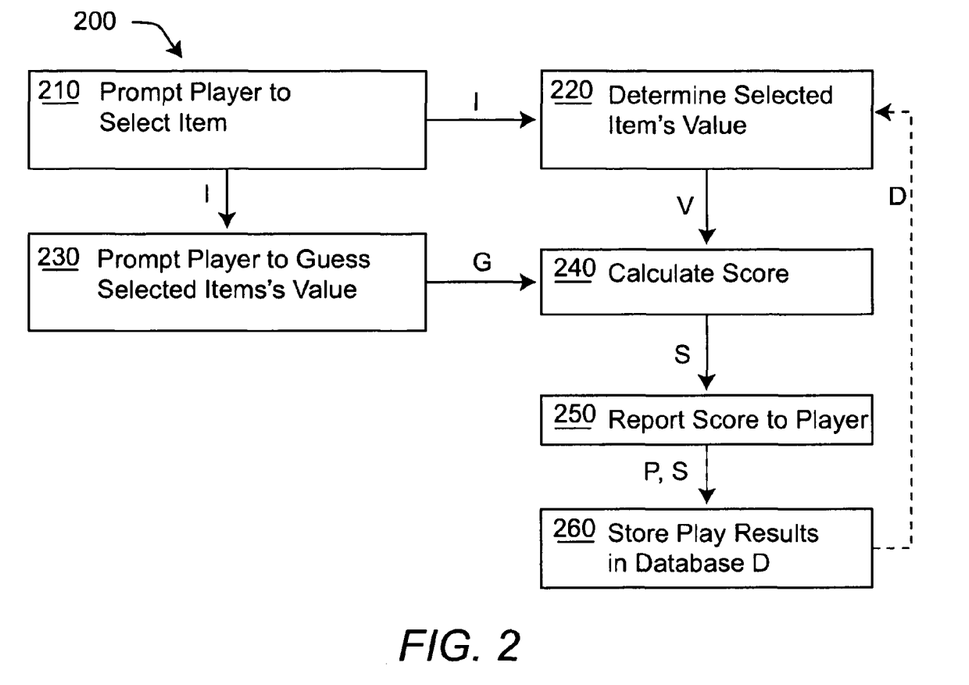
FIG. 2 is a flowchart of a first embodiment of a method for a game.

FIG. 2 includes an embodiment of a market-based simulation game 200 that is playable over system 100. In one embodiment, a goal of game 200 is for a player to guess an item's value. Game 200 includes steps shown schematically in Blocks 210, 220, 230, 240, 250, and optional Block 260. In each play of game 200 a player, P, selects an item I, and guesses a value of the item, G. Game 200 further determines an item value V which may be a real, a market-based, or a simulation-based value, and determines a score, S, for player P that is indicative of the accuracy of the player's guess (that is, how close G is to V).

In one embodiment, the value of P may be a person's actual name or a login name. The values of G and V are in units of currency. I may be a unique identifying number for the item, or may include one or more numbers or characterizations of items which may be searchable within game 200 to obtain categorization of the results.

Block 210 is representative of an embodiment where player P is prompted to select item I. Examples of item I include, but are not limited to real estate, home furnishings, travel, fashion, automobiles, and collectibles, or art. In one embodiment, simulation system 130 presents a web page to a player at device 110, according to Block 210, with a prompt for the player to select an item. In various embodiments the item selection prompt may include, but is not limited to, a map-based input, a pull-down menu, or a text input box that provides a database look-up. Thus, for example, information identifying player P and item I is then transferred from device 110 to simulation system 130 over network 120.

Information identifying item I from Block 210 is provided to Blocks 220 and 230. In Block 220, the value V of the selected item I is determined. In various embodiments, the value V of item I is determined, for example and without limitation, by looking-up an actual sale price from a database ("real-world data"), by an economic and/or statistical model that predicts market prices based on the sale or valuation of similar properties, or from the result of guesses of other individuals which may be, for example, other players of one or more games. Such methods are referred to herein, without limitation, as a "pricing algorithm."

In Block 230 player P is prompted to provide a guess G of the value of item I. In one embodiment, devices 130 present a web page to a player at device 110 with a prompt for a guess of the selected item's value. In various embodiments the item value guess prompt includes, but is not limited to, a pull-down menu or a text input box that provides a database look-up. In another embodiment, player P is provided with information regarding the item, and a slider bar that is positionable within a range of values. After the player guesses the value G, the guess is transferred from device 110 to simulation system 130 over network 120.

In Block 240 game 200 accepts the value of V and G and calculates a score S. In one embodiment, simulation system 130 compares values V and G provided from Blocks 220 and 230 and generate a score S indicative of the accuracy of player P's guess was. Thus, for example, $S=e^{-|G/V-1|}$, provides a score S ranging from S=1 for an exact guess to S approaching zero for less exact guesses.

In Block 250 the score S is presented to player P. In one embodiment, simulation system 130 transfers the score determined in Block 240 over network 130 to for presentation on a web page on device 110.

In an optional Block 260 the play results are stored in a database D for later use. In one embodiment, database D is optionally used in Block 220 to determine an item's value. If j is an index of an individual play of the game, each play is characterized by $\{P_j, I_j, V_j, G_j, S_j\}$, where $P_j$ is the player of game j, $I_j$ is the tangible item selected by the player of game j, $V_j$ is the determined value of the tangible item, $G_j$ is the player's guess of the selected tangible item, and $S_j$ is the player's score resulting from playing game j.

Database D includes, in one embodiment, each score S obtained by player P from sequential plays of game 200, such as the sequence of pairs $\{P_j, S_j\}$. In another embodiment, database D includes each S and corresponding item I from sequential plays of game 200 by player P, such as $\{P_j, I_j, S_j\}$. In yet another embodiments, database D also includes value and/or score information such as $\{P_j, I_j, V_j, G_j, S_j\}$, $\{P_j, I_j, V_j, G_j\}$, $\{P_j, I_j, V_j, S_j\}$, or $\{P_j, I_j, G_j, S_j\}$. In some embodiments, the information Ij is a single specific identifier for an item (such as, for real estate items, a street address) which may itself include several categories (such as city, state, and zip code), or may include one or more characterizing identifiers for an item (such as the number of rooms and list of amenities).

Figure 3:
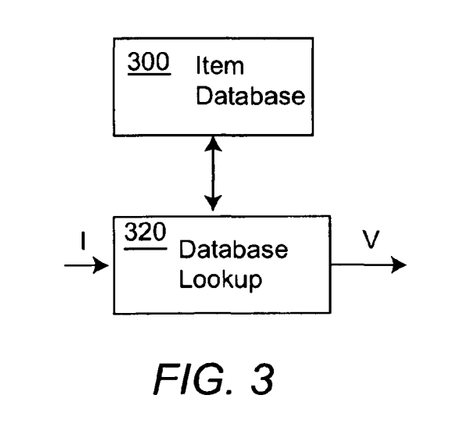
FIG. 3 is a flowchart of a first embodiment valuation method.

FIG. 3 is a flowchart of one embodiment of a Block 320 and an item database 300. Block 320 may be generally similar to Block 220, and item database 300 may be generally similar to database D, except as described subsequently.

Item database 300 includes the sales prices or valuations of items I. Block 320 determines the value V by looking up the selected item I in item database 300 and returning an actual sales price or valuation V.

In one embodiment, item database 300 includes a table identifying individual items I and the corresponding sales price or valuation V. Game 200 may include a player selecting an item I from a plurality of items in Block 210 and providing a guess G for the value of the item in Block 230, the game looking up the value V from database 300 in Block 320, and then calculating a score S in Block 240.

Figure 4:
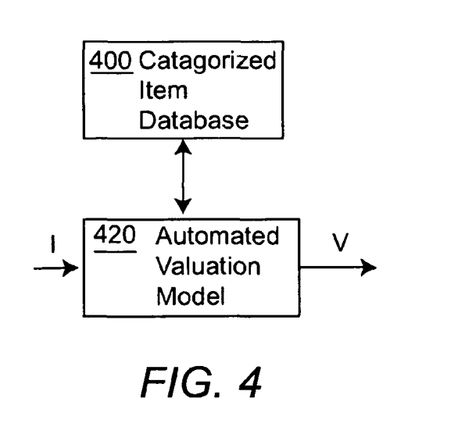
FIG. 4 is a flowchart of a second embodiment valuation method.

FIG. 4 is a flowchart of one embodiment of a Block 420 and a characterized item database 400. Block 420 may be generally similar to Blocks 220 or 320 and characterized item database 400 may be generally similar to database D or 300, except as described subsequently.

Block 420 includes an Automated Valuation Model (AVM) (Block 401). AVMs, as is known in the field, are used to obtain an estimate the value of a specific item by analyzing the value of items having similar characteristics. A description of such models may be found, for example, Rosen, Sherwin, "Hedonic Prices and Implicit Markets: Product Differentiation in Pure Competition," *Journal of Political Economy*, vol. 82, no. 1, (1974), and Carbone, Robert and Longini, Richard L. "A Feedback Model for Automated Real Estate Assessment," vol. 24, no. 3, *Management Science* (1977), 241-248.

As an example, of an AVM, Block 401 analyzes database 400 within the context of a valuation model to determine an estimate of the sales price or valuation V of item I, where item I is not necessarily present in database D. Thus for example, consider a case were item I is a specific house which has not sold in several years. In one embodiment, database 400 and Block 401 reside in simulation system 130. In another embodiment, database 400 and Block 401 may reside in another networked computer.

Characterized item database 400 may include a table of identifying characteristics of items I and the corresponding sales price or valuation V. Game 200 may include a player selecting an item I having characteristics in Block 210 and providing a guess G for the value of the item in Block 230. After item I is identified in Block 210, game 200 determines the value V from database 400 using the AVM of Block 401, and then calculating a score S in Block 240.

Examples of information contained within characterized item database 400 include, but is not limited to, information characterizing a plurality different items, including their values. For real estate, for example, the characterizing information includes the address of the property. The address may be used to characterize the location of the property by zip code, city, region, or state. Additional information may include, but is not limited to, the number of rooms, size of the house, amenities, and other specifics that are usually provided when describing a house. Importantly, an individual item I may be, but is not required to be, contained within database 400. The AVM matches some or all of the characterizing information, as found in database 400, to that of item I to find items with similar characteristics (such as, same zip code, same number of rooms, etc.). The values of the items having similar characteristics, as stored in database 400, are used to estimate the value of item I. In one embodiment, the values of items having similar characteristics to item I are averaged.

As a further example of characterized item database, the following lists representative characterizing information certain types of tangible items. Real estate may be characterized by street address, city, state, country, zip code, area code, number of bedrooms, number of bathrooms, type of heating, and/or does the house have air conditioning or a fire place. Classic cars may be categorized by: make, model, year, engine size, and/or color.

Figure 5:
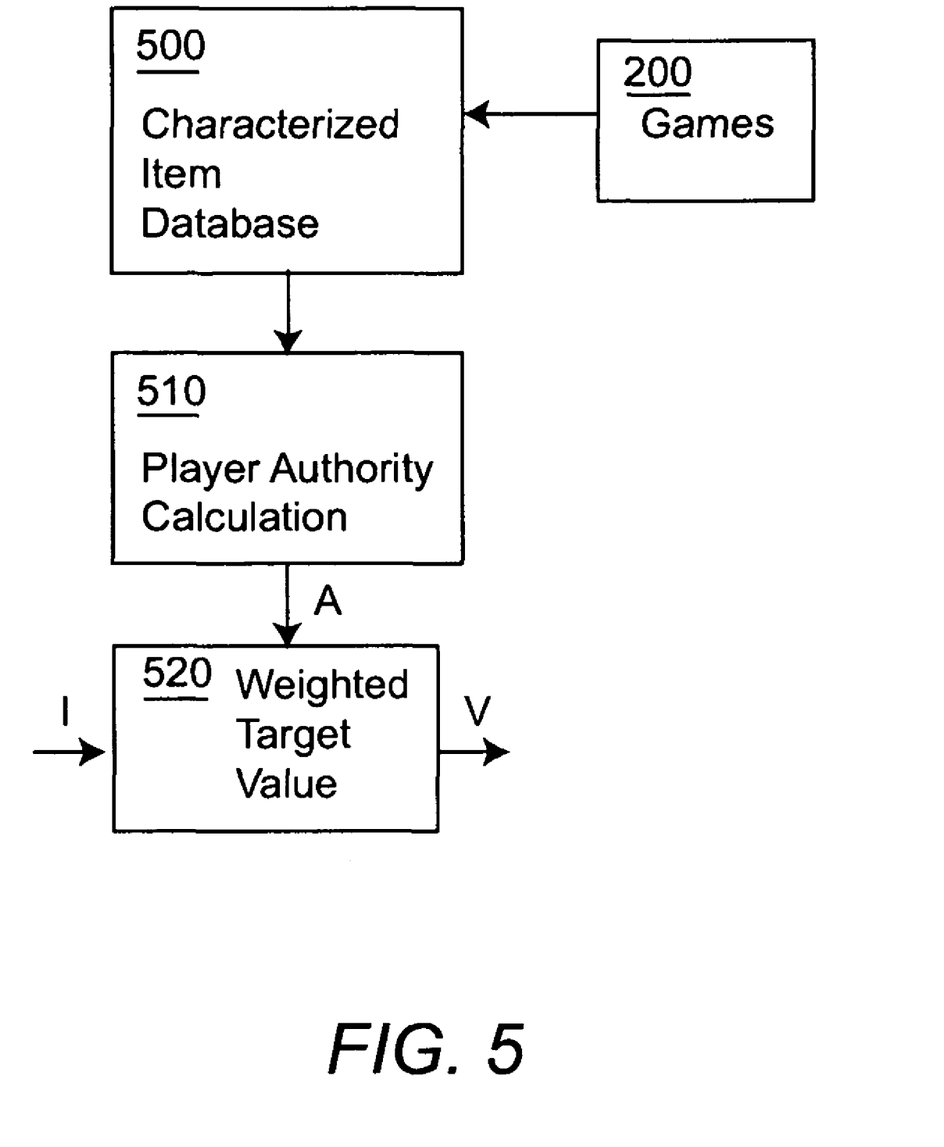
FIG. 5 is a flowchart of a third embodiment valuation method.

FIG. 5 is a flowchart of one embodiment of a Block 520, a characterized item database 500, and a player authority calculation Block 510. Block 520 may be generally similar to Blocks 220, 320, or 420, and database 500 may be generally similar to database D or 400, except as described subsequently.

Blocks 510 and 520 determine value V of item I using a "wisdom of the crowd" method. Example of such methods may be found, in generally, in Surowiecki, James, *The Wisdom of Crowds: Why the Many Are Smarter Than the Few and How Collective Wisdom Shapes Business, Economies, Societies and Nations*, Little, Brown (2004), Sunstein, Cass R., *Infotopia: How Many Minds Produce Knowledge*, Oxford University Press, (2006); Cherry, S., "Bet On It," vol. 44, issue: 9, *Spectrum, IEEE*, (2007), 48-53. Certain embodiments of a wisdom of the crowd method of the present invention may track the accuracy of guesses of individual players. An example of an embodiment of a pricing algorithm is described subsequently in the section titled "Example of a Wisdom of the Crowd Algorithm."

Database 500 is generally similar in to database 400 in that it stores may include a table of identifying characteristics of items I and the corresponding sales price or valuation V. In addition, database 500 stores game results including one or more of the guess G and/or score S. Combinations of guess G, value V, and score S may be used to determine an authority A In determining value from a crowd estimate, one embodiment of the present invention assigns at least one "authority" to each player. Authority is a measure of how accurately a player can guess the value of items in relation to the estimated value of that item as determined by guesses of other players. In general, the estimated value and the authority of each player may change at each play of the game. Thus, for example, consider a specific player that has, through many games, shown that their guesses are accurate (that is, that their guesses are close to the value used by the game). This accuracy may be reflected, for example and without limitation, by high scores S. Such a player would be assigned a high level of authority. Conversely, a consistently poor guesser, that is a player having low scores, is assigned a low level of authority. In one embodiment, each player has one authority. The authority may be calculated from, or may be included in, database 500.

Alternatively, each player may have different authorities corresponding to different items or categories of items (each player has several "segmented authorities"), each of which may be calculated from, or may be included in, database 500.

The reason for having segmented authorities is that each player's ability to accurately guess a value may depend on the item or category of item. As one example, which is not meant to limit the scope of the present invention, assume that game 200 includes both residential real estate game and modern art. It would be presumptuous to assume that a player's authority would be the same for real estate and for art. In this embodiment, game 200 calculates two authorities for each player—one based on their results when they selected real estate and the other based on their results when they selected art. As another example, game 200 includes residential real estate in several cities. Again, It would be presumptuous to assume that a player's authority would be the same for real estate in two different markets. In this embodiment, game 200 calculates a separate authority for each player based on their results of selecting real estate in the different areas.

Block 510 receives information from the results of all previous game play, and assigns an authority to each player, or to each player for a limited subset of items.

Database 500 may thus be used to determine a single authority value for a given play of game 200 for each player, which may also be stored in database 500 and updated each time a game is played. In Block 510 the authority of the different players is determined from information in database 500, and in Block 520 the authorities and guesses for the different players for either the identical items I or for items having the same characteristics as I are combined to give an estimate for the value V. Thus, for example, a weighted average of each players authority and guess for the value V of item I may be assembled to obtain a value V corresponding to a "wisdom of the crowd" estimate.

In various embodiments, database 500 is used to determine segmented authority for either a specific item or for a category of items. Thus, for example, characterization of item I is used to determine a group of items that are similarly categorized. Examples of the characterization of item I may be, for example, real estate within a given zip code, or pieces of art from a certain time period, or collectable baseball cards from the 1950's. Database 500 is then analyzed to determine which plays of game 200 involved the categorized item, and an authority is determined for each player that has played a game with that categorized item. This analysis gives the authority for each player for items that have the same categorization as item I. The authority and players guesses may then be used to obtain a value V.

Each game 200 may be considered as having a separate database with separate players. Thus, for example, real estate games may include a plurality of games, each covering different geographical regions. This permits each player to have different authority for different segments of similar items. In other embodiments, the segmentation is controlled and, for example, if it becomes apparent that players have similar authorities for different segments, the segments may be combined for future playing of the game.

In one embodiment, a game 200 may include various pricing algorithms, such as a database lookup, as in FIG. 3, for an initial value V, followed by an AVM, as in FIG. 4 or a Wisdom of the Crowd algorithm, as in FIG. 5.

Example of a Wisdom of the Crowd Algorithm

The following is an illustrative example of one embodiment of a pricing algorithm that estimates the eventual sale price of a HVA from a multitude of player's guesses (where the sequential guesses of a HVA are referred to as "moves"). The pricing algorithm may be, for example and without limitation, be represented by Blocks 510 and 520. The illustrative algorithm jointly evaluates the expertise of each of the game's players and predicts the sale price of a HVA. In the following discussion, each HVA is assumed to have a "true" value, and each player's guess is considered to be a noisy observation that true, yet unknown, value. From these observations, the algorithm builds an authority model for the players using a Factor Analysis model, which is solved using Expectation Maximization.

In one embodiment, the pricing algorithm simultaneously: i) determines the authority (that is, the expertise) of each player based on the accuracy of the player's previous guesses, and ii) infers the underlying value for each HVA from the previous guesses and authorities of a plurality of players. The algorithm uses a Factor Analysis model, which can be solved using Expectation Maximization (see, for example, Bishop, "Pattern Recognition and Machine Learning," Springer, New York, 2006).

In one embodiment, the pricing algorithm first calculates an "uncertainty" for each player, where the uncertainty is a measure of how poorly the player estimates the estimated value. The uncertainty is a number that ranges from 0 to infinity, though it is rarely larger than 1 or 2. The uncertainty is then transformed into authority. In one embodiment, the authority can be simply calculated from the learned observation noise for each player using techniques familiar to those skilled in the art of Factor Analysis and Expectation Maximization. In another embodiment, the authority is the inverse of the observation noise, which can then be mapped to a player-visible quantity as the game designer sees fit.

The general flow of one embodiment of the pricing algorithm is as follows. First, the algorithm begins with the a listing price for each HVA in the game. Those prices are treated as the current estimate of true values, and the algorithm assigns authority to each player based on how close each player is to the listing price. Second, the algorithm uses all the authorities to refine its estimate of true values (which, in general, is no longer the listing price of the item). This refinement is done by weighting player moves by each player's authority. The specific weighting for authority and price estimation is based on Gaussian probability distributions. Finally, the algorithm repeats the first step, updating authorities based on estimates, and the second step, updating estimates based on new authorities. For many conditions the pricing algorithm converges to an optimal estimate of both authorities and price estimates.

As a didactic (but hypothetical) case, consider a game in which the true value of homes is precisely the listing price, and all players had exactly the same authority. If the algorithm was started at those prices and authorities, and the player moves reflected those prices and authorities exactly, then the pricing algorithm would terminate immediately (as it already had the optimal estimates of authority and price). If the initial price estimates or the authorities were slightly off, however, one or a few iterations might be required. In general, authorities are quite diverse and listing prices are often several percent away from the true price, so more algorithm iteration is required for convergence.

Both Factor Analysis and Expectation Maximization are known in the field of pattern recognition. In addition to standard Factor Analysis and Expectation Maximization, one or more of several modifications may be made to provide a pricing algorithm more suitable for estimating the value of assets where data is sparse and the value between items may be great. The following are modifications, some or all of which may be present in a pricing algorithm.

First, in one embodiment, the Expectation Maximization routine is modified to account for sparse data. That is, since not every player will guess each item, the data will be highly sparse data. In one embodiment, the guessed price is selected to be the prior mean (the listing price). This may introduces bias, in that there will be many "pseudo-moves" at the listing price. One method to account for this is bias to alter the standard Factor Analysis observation model to allow for observations to be unseen, which is mathematically tractable and does not sacrifice the convergence properties of the algorithm.

Second, moves are normalized by the listing price. Some HVAs (such as real estate) can be priced orders of magnitude differently. In one embodiment, suitably normalizing the data improves convergence of the algorithm. The improvement results by making the moves have comparable differences. Thus, for example, the standard Factor Analysis loading matrix can be the unity vector, and all prices can be considered noisy views of the normalized true price.

Third, when sold prices do become available, they may be incorporated into the Factor Analysis model as known true values of the particular asset. In the Factor Analysis framework, this can be done mathematically or, equivalently, by the inclusion of a pseudo-player who bids only the sold prices and who has an arbitrarily high authority.

Fourth, techniques may be used to speed up calculations when large amounts of data are obtained. Specifically, mathematical and algorithmic manipulations beyond the standard model may be needed to ensure fast run time and good performance. Factor Analysis typically requires the manipulation of matrices. Owing to the one dimensional, constant, loading matrix (there is only one singleton true value for each home), the matrix inversion lemma (also called Sherman-Woodbury-Morrison formula; see, for example, Boyd and Vandenberghe, "Convex Optimization," Cambridge University Press, Cambridge, UK, 2004) can be applied throughout the algorithm, yielding great computational savings. Accordingly, matrix determinants must also be decomposed. With these steps done, the EM algorithm updates become simple singleton algebra; linear algebra packages for matrix manipulation are not required.

Figure 6:
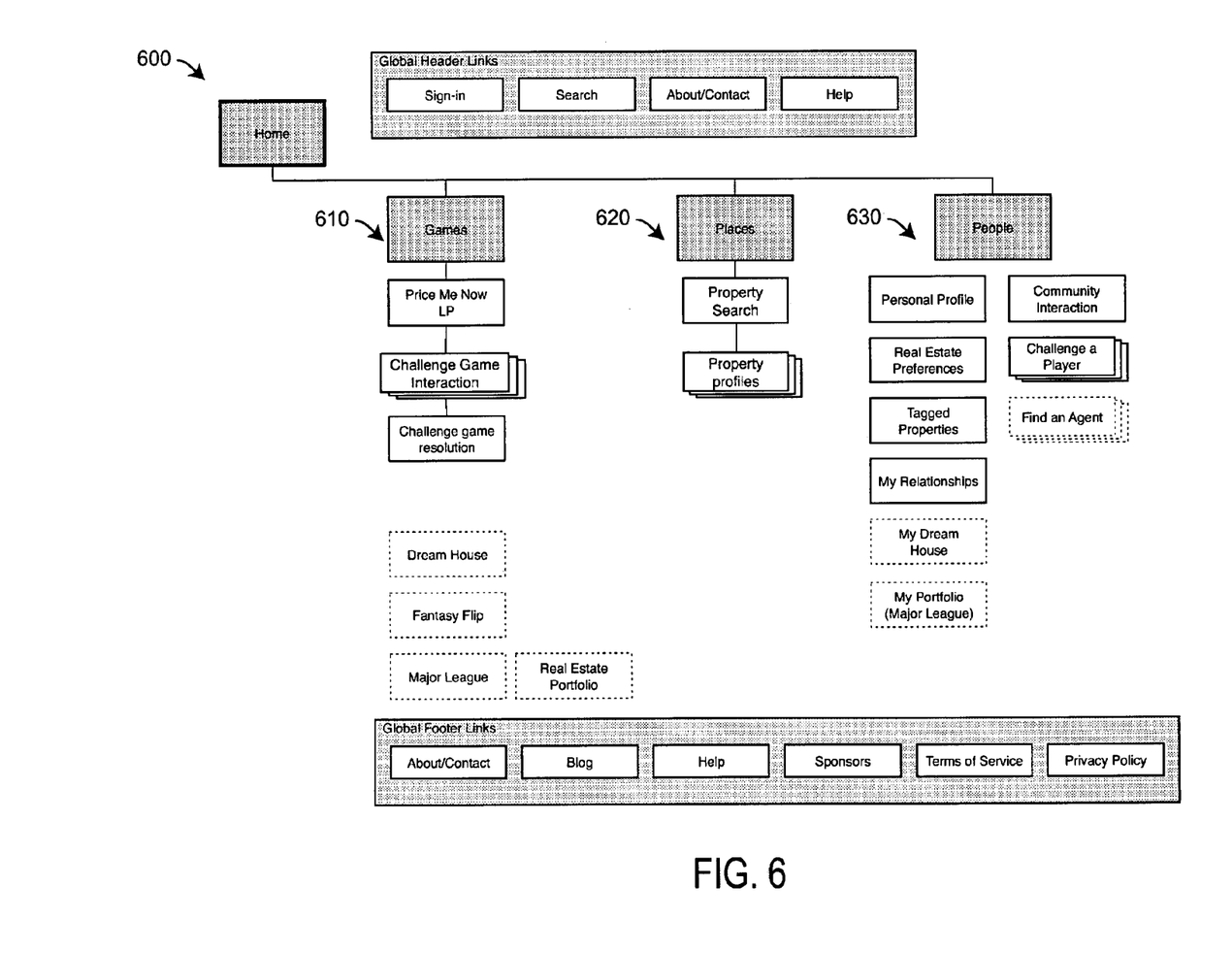
FIG. 6 is a site map for a website including at least one embodiment of a game.

FIG. 6 of a site map of a website 600 that may, for example, be provided by simulation system 130. Website 600 that provides access to one or more components or groups of applications, some of which may be a game 200. It is understood that other embodiments may include only one of the applications, or different applications. The following are examples of components and classes of applications which are not meant to limit the scope of the present invention.

Home Page

Website 600 includes a home page 610 from which a player may access additional web pages grouped as applications or games 620, places 630, or people 640. In some embodiments, one or more games 620 is a game 200. Places 630 include details of properties within the website, and allow players to access or search individual properties (property search and property profiles). People 640 provides community for the players by allowing them to provide information about themselves (personal profile, real estate preferences, tagged properties, community interaction, etc.)

Home page 610 is preferably designed to quickly engage users with one of the games. In various embodiments, some or all of games 620 require the player to log in.

In one embodiment, home page 610 may include one or more of the following:
1. Information about and direct links to the games and registration/login.
2. Links to the following standard sub-pages About us, About Sponsors, Terms of Service, Privacy Policy, Contact Us, Blog
3. Prize winners
4. Active players and player buzz
5. Map of where you are so that you can use it to decide where you want to play.

If logged in, the home page will be modified to show some player profile information.

Games

In general, each game 620 will have its own game component that reflects the rules and actions that the player needs to take to play the game. The games are preferably easy to use and are self explanatory. For those games that have an immediate resolution, the game object will also include the resolution component, which shows the results of the game play.

The player of game 620 may received random pop-up messages to encourage, congratulate, or challenge them.

In addition, one or more of games 620 may permit the user to "Ask the Expert," which may be, for example, a sponsor supplied expert, that permits the user to request information that are relevant to a specific game from experts in the elements of market area addressed by the game, such as real estate, interior design or remodeling. The "Ask the Expert" may thus require an interface that allows the sponsor to upload information to the application. In one embodiment, "Ask the Expert" supports a photo, video, or text (RSS feed). In another embodiment, the game will provide bloggers the ability to syndicate their entries or write special entries for the game. Specific examples of games 620 include, but are not limited to, the following.

Game 1: It Sold for What!?!

It Sold for What!?! is a game 620 in which players guess the recent sales price for a given product such as a home, piece of art, vacation package from a selection of prices (which may be, for example and without limitation, 3 or more prices) presented to the player. Players are presented with a profile for the product, such as a house (the "Product Object") and the website response with at least three prices including the actual sale price (the "View Price"). The player is prompted to select the real price. The Listing Object includes a gallery of pictures, product description, and other market data and, in the case of real estate and travel, a map showing the location of the subject property and the comps.

It Sold for What!?! may be played by clicking on the price that the player believes to be correct, and for which the player will receive points for being correct. In one embodiment, points are awarded to the player's account based on if there guess is correct. In another embodiment, the difference between the three prices starts out large, e.g. +/−20% to start. As the player demonstrates success, the price difference is reduced. At the end of the game, the sales price is shown, points are awarded, and the next home is shown to the player. In another embodiment, a display ("streak meter") shows the number of consecutively correct guesses.

Products (homes, vacation packages, automobiles, are presented in a jukebox manner, referred to as the "play list." For location-based products it is preferred, though not necessary, to begin with homes close to the home location of the player, based on the location information from their browser. If the player is out of country, a starting location may be selected for the player.

The data needed to operate this game includes, but is not limited to, sales data such as pictures, property description (bed/bath, home/lot size), and sales price supplied by the Listing Broker and/or obtained from public records.

The data recorded by the system operating the game includes, for example, a list of the products viewed, products priced, and correct guesses.

The game may be sponsored by, or provide ads for those companies that provide services and products to the given sector, such as real estate brokerages and banks for the real estate sector.

Game 2: Price Me Now (PMN).

Price Me Now is a game 620 similar to It Sold for What!?! with a focus on homes listed for sale or uploaded by players or other users. Player are presented a profile for a house, either from a real data feed or an imaginary ("Fantasy") real estate home, and are prompted to guess what others think it is worth based on the data given. Others include experts (such as appraisers, brokers, and economists), the community (those playing the game), friends and Automated Valuation Models (such as the model used by Zillow (www.Zillow.com)). Basic data may include a photo gallery, lot size, bedroom/baths/other rooms, square footage, and/or city/neighborhood. The player may, in certain embodiments, request to expand the data to a more detailed view. Once the player enters their price for the home, a Resolution Screen is displayed to the player. The Resolution Screen includes their guess and the estimate provided by the group they are playing against. In the case of the community, the estimate, which is the average of valid prices that have been submitted, is referred to as the Community Price (CP). Points are awarded to the player's account based on how accurate their listing price was compared to the target price they estimating.

Price Me Now is a relative pricing game. Points will be rewarded based on the distance of the estimate from the target price. Upon guessing a price, the quality of the guess is displayed, the actual CP is displayed, points are allocated, and next home is displayed for pricing. In one embodiment, the scoring model is an IQ scale (0 to 200) to score the users.

In another embodiment, players can exchange their points for tokens, which can be entered into a sweepstake drawing.

The data needed to operate this game includes, but is not limited to, listing data—such as pictures, property description (bed/bath, home/lot size), a location map and latitude-longitude locator for the property.

The data recorded by the system operating the game includes, for example, homes viewed, homes priced, and price estimates. The asset list for this game's web page includes, but it not limited to, an interactive pricing widget, with sounds for resolution.

The game may be sponsored by, or provide ads for, brokerages or financial services.

Figure 7A:
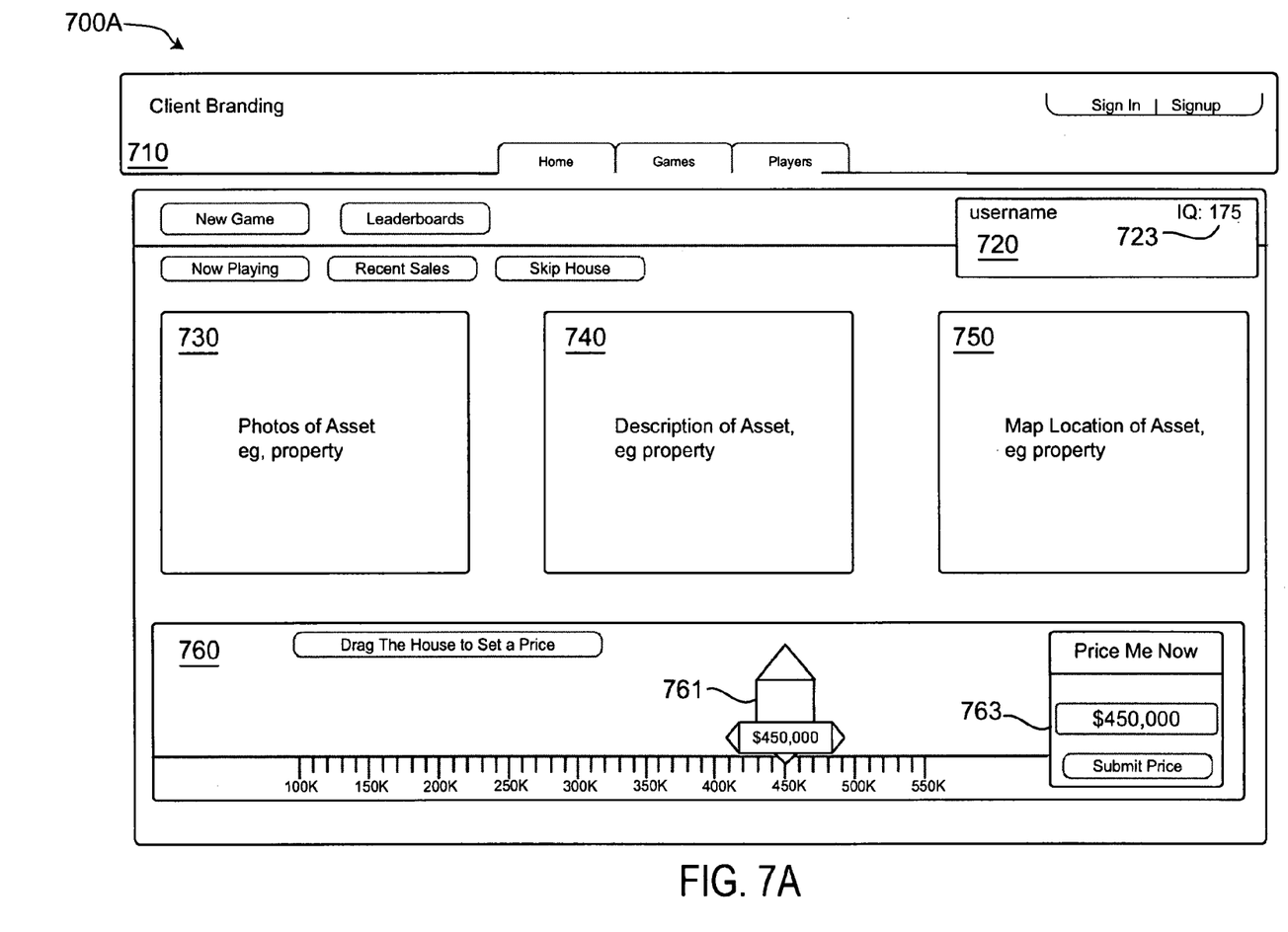
FIG. 7A is a wire frame of a first screen for playing a game according to FIG. 5 on the system of FIG. 1.

An example of two web pages for PMN is shown in FIGS. 7A and 7B. FIG. 7A is a first screen 700 that is prompting a player to provide a guess as, for example, prompted by Block 230. Screen 700 has an area 710 along the top with targeted advertising, and area 720 with the player's name and a score (IQ 721) with a cumulative score for playing PMN, central areas 730, 740, and 750 having photos, a description, and a map, respectively, of the property being guessed, and an area 760 along the bottom for providing a guess. Specifically, area 760 includes a slider 761 and a submission area 763 for providing a guess. The IQ may be score S as calculated in Block 240.

Figure 7B:
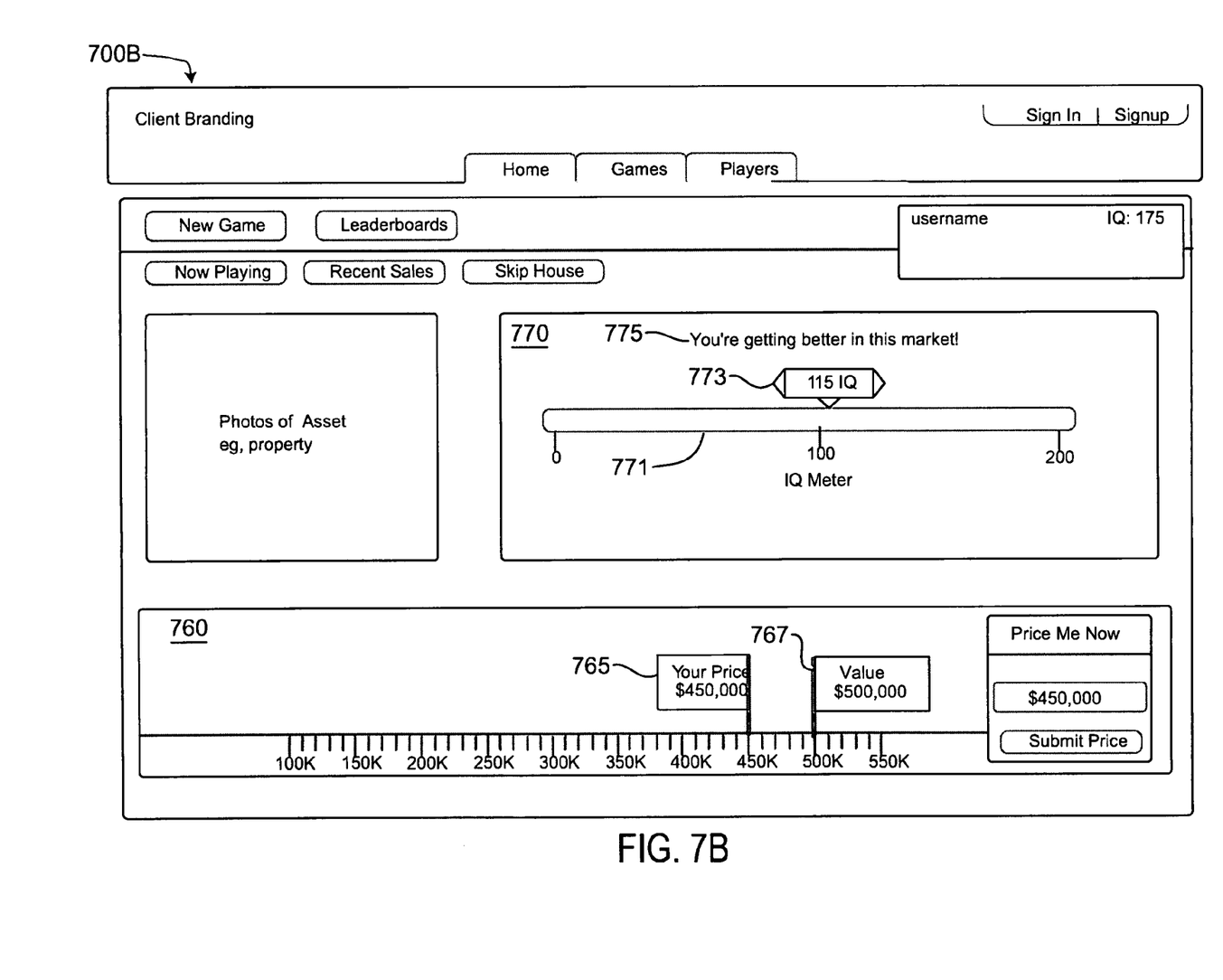
FIG. 7B is a wire frame of a second screen for playing a game according to FIG. 5 on the system of FIG. 1.

FIG. 7B is a second screen 700B showing the result of a play as, for example, provided by Block 250. Screen 700B has many of the same features as screen 700A. The player's guess (G) from screen 700A is shown as flag 765 and the value V is shown as flag 767. Areas 740 and 750 from screen 700A are replaced with an area 770 having an "IQ Meter" bar 771 showing the IQ 773 and words of encouragement 775.

Game 3: Major League Investor (MLI)

Major League Investor (MLI) is a portfolio growth game 620 in which players buy real estate (in one embodiment, with one click from PMN) and then sell the real estate in an attempt to increase the value of their total assets (cash+homes). Players strive to build the largest net worth through continuous buying and selling of real estate. Each player is provided with a stack of play cash (such as $100 million) to start. As homes are reviewed on PMN or in the Places section of the website, players may acquire them for their portfolio based on the current market price of the home on PMN by "flagging" the property for inclusion in their portfolio. The market price of the home continues to move as others price it on PMN or as the external AVM changes. Players can sell the home back to the system at any time or wait until the final price arrives from the MLS or County Recorder and that is used to clear the market.

MLI can be played in an open public league on a national level, regional or local level. Private leagues can also be set up and include a limited number of players (<20) by invitation only. Open leagues may be segmented by expertise, including professional leagues, which require a broker license to enter.

The goal of the game is to build the largest net worth through buying and selling of real estate. Players are rewarded based on their ability to set league type by property, location, and expertise.

Growth of a player's portfolio takes them to higher levels of the game. Leagues in the form of short-term, time-bound contests among investors may be supported. In a given Private League, a home can only be owned by 1 player.

The following elements may be included on a web page presented to a player.

1. Map to plot your holdings
2. Data table to list your holdings and their current value
3. graph to show change in value over time—for individual property and portfolio
4. Scoreboard to show place in league
5. Chat/message board to communicate with other players
6. League setup page The data needed to play Major League Investor (MLI) may the same as for Price Me Now for individual homes. MLI needs to manage the user's cash balance, time and cost of property acquisition, current CP or AVM result for homes and final sales price for homes.

The data recorded is the Purchase of a home on PMN, including time and current CP or AVM, and the sales of portfolio homes and current CP so that the sale is translated into cash. The scoring system is based on the portfolio value=cash+deed value of homes−financing costs.

The asset list for this game's web page includes, but it not limited to, a portfolio widget, value trend graph, sound for purchase, sound for sale, images for game levels. Deed for homes in your portfolio, and a map of the portfolio.

The game may be sponsored by, or provide ads for, brokerages, banks, or title companies.

Game 4: Fantasy Flip (FF)

Fantasy Flip is a game 620 that allows players to take a home from their MLI portfolio or upload information about their own home and present it as-is or upgrade it with standard improvements to the interior (kitchen, floors, baths, etc.) or the exterior (roof, paint, landscaping). Players may update the description and put it back on PMN to see what other users would be willing to pay for the updated home.

Fantasy Flip tests current value of one's home or a player's instincts about upgrading a product such as a home or an automobile and reselling it—typically referred to as Flipping. Players can take any home from their MLI portfolio and put it "under construction" ("UC"). While UC, the home can not be resold. Players then transform the home by simulating the process of upgrading the home. The game system will provide a gallery of pictures that reflect improvements that can be made to the home and standard costs and user defined costs for the work. Players select the improvements to be made, update the description of the home with new text and pictures and then put it back into PMN for repricing. The players gain (loss) is the new sales price minus purchase price—investment. In another embodiment of the game, a user can upload photos and descriptions for their own home, including planned remodel projects. The player can then obtain information about what the game community thinks of their home in terms of the market value and a rating (1 to 10), where 10 is best.

The game is resolved upon sale of remodeled home on PMN. The net return=Sales price−sales commission−purchase price−improvement costs.

The data needed for this game is a collection of home improvements and standard costs, including photos. Players will be allowed to upload their own photos.

The data recorded includes, but is not limited to, purchase price of home, home improvements to be made, cost of improvements, photos for improvement, and new description of home that reflects improvements.

The scoring system of the game is based on the net return, which adds value to the player's MLI portfolio.

The asset list for the game includes, but it not limited to: a flag to indicate that the home is a Fantasy home, photos of home improvements, cost profile for improvements, list of home improvements, and sound to indicate home is under construction.

The game may be sponsored by, or provide ads for, home improvement centers (Lowes, Home Depot, 84 Lumber, Ace), or appliance and building material manufactures (Pella windows, door company, Interface carpets, etc.).

Style and Preference Games (also referred to herein, without limitation, as "Dream House Games") are a category of one or more applications 620, which may be inter-related, and that entertain and permit a user to develop a profile of their home and community tastes and preferences, including a gallery of images and information about what they consider to be "My Dream Home."

In Style and Preference Games 620, players explore preferences about home, neighborhood and community through entering a game referred to herein as the "Dream Machine".

Game 5: Dream Machine

Dream Machine is a preference profile game 620 that rapidly displays divergent photos and concepts on the screen about which the player must choose the one that they prefer. This is a simple game that shows the player various related photos and the player selects the one that they prefer. Dream Machine image sets will be organized by room of the house, exterior styles, landscaping, neighborhood features, amenities and lifestyle items. A profile of the person's housing and community preferences are then gathered in their profile page. See, for example, the website http://www.imagini.net as one example of this approach.

The Dream Machine may include a statement and a series of images side-by-side and the user chooses the one they prefer. The images will be from similar genre's, such as golf vs biking, city street scene vs. cul-de-sac, walk to store vs. drive to store, modern furniture vs. antiques, etc. The player is scored based on the number of Dream Machine slides they view and vote on. There is no right or wrong in Dream Machine.

The results of the Dream Machine will feed into the user's "Dream House" profile. Within the profile, each player is provided with a basic home. As the player earns points by traveling through the Dream Machine, they can build out My Dream House.

My Dream House is a record of the things that the player likes and wants in their house, yard, neighborhood and other parts of their life that relate to my place, such as dream vacations. My Dream House is located on a map with a push pin. Each user can decide where they want their Dream House to be located. Players can create more than one My Dream House.

Game 6: My Dream

My Dream (MD) is an application 620 in which a user designs their dream product. In one embodiment in the real estate market, My Dream is referred to as My Dream House; in the travel market it is referred to as My Dream Vacation; in the automobile market it is referred to as My Dream Car. The user's MDH is placed on a map among other MDHs. Users can look through other MDHs, leave comments, and borrow ideas.

My Dream House is a user generated content application that allows the user to describe their dream house in terms of location, size, style, etc. The options are seeded for the user based on the results of their Dream Machine profile. Different variations of this game include Green Dream, Vacation Dream, and City Dream. For example, Green Dream includes homes that utilize a large percentage of "Green" building materials; Vacation Dream includes homes that are based in vacation markets such as Hawaii or the Sierra Mountains; City Dream includes homes that are exclusively located in larger urban areas.

While website 600 is described as being directed towards real estate, there are other types of games which can benefit from using "real world data" (such as actual sales data) can be used to drive a reality game. These include other tangible items including, but not limited to, HVAs.

Places

The portion of the website referred to as places 630 include details of properties within the website, and allow players to access or search individual properties (property search and property profiles).

About a Property

This site component of places 630 includes all the information about a given properties including, but not limited to:
1. Listing description—broker text, bed/bath/SF, etc.
2. Additional property information—heating/AC, fireplace, pool, etc.
3. Photos and videos, if available
4. Listing agent
5. Listing price and sales price, when available
6. Location—Lat/Long or address for mapping
7. Changes to the property generated through a game, such as Fantasy Flip In one embodiment, data obtained from other sources is stored and/or reformatted for display to a user and/or for using in one or more applications.

People

The portion of the website referred to as People 640 includes components that include detailed information about the players' game status, uploaded content, community relationships and affiliations, preferences and related information. Some or all of this information may be available to the player.

Each player (registered user) will have a profile. This site component stores and presents the player profile. The game of the profile should be more prominent in the profile than the private profile—real estate and broker information. The player profile should be so rich that players want to visit their profile on a regular basis. It is equivalent to looking at your team roster in a Fantasy Sports site. Based on all the elements described below, the Player Profile will be a multi-page area of the site. It is divided into three distinct groups of information—private information, community or network information and game information.

Elements of the profile may include, but are not limited to:
Private Information
User Name
Password and related password management options
Avatar—provide selection of Flickr photos to choose from (see, for example, www.swivel.com)
Private Profile—other demographic data (desired home size, type, location, mortgage, kids, recreation, etc.)
Private Profile—Real Estate status—buying, selling, just looking Private Profile—Existing Broker/Agent information—my broker.

My PMN Listings—this page of the player profile stores information about homes that the player has create their own PMN listing. It will include an area to upload and arrange photos, describe the home in free form text and fill out a home characteristic profile. The home characteristic profile will be similar to the base information we obtain for each listing. Information about how many times the home profile has been priced and the distribution of the prices and average price will be listed.

Community/Network information

Public Profile

Semi-Public Profile—pricing history and other information on hometown neighborhoods. Made available to game "friends'

Member since . . .

Friends—those people you share information with on the site; including those you have invited to the site Groups—those groups or leagues that you are part of on the site Affiliations—those groups that you are part of outside of the site that you want to share with your network (professional groups, community groups, etc.)

My Place Profile—(also referred to as Placeology)—a map where you can add a push pin for all the places that you have lived and the places you want to live. There will be three colors—one for history, one for current and one for future. User can annotate each area with some text. The text shows up in the map popup when a pushpin is selected. Each location added can be set as public or private.

Game Information

Game level summary from the Profile—a summary of the players status in each game—include times played, number of streaks, longest streak, $$ earned in game.

Ranking, by game and overall

Game Points—the amount of points the player has accumulated through playing PMN and other point-based games.

Game Account—amount of money the player has. Each player will start with a given amount of money when they sign up. Thus, for example, each player may start with an account having $100,000,000.

Treasure chest subaccounts. We will collect your funds and organize them by game area, so that we can have game level leader boards.

Sweepstake/Awards entered—number of tokens entered and status of next drawing

MLI portfolio and asset value

List of homes that player has priced/played on PMN

Fantasy Flip homes—past, present and prospective

Professional Information—for Real Estate Agents Only

Links to their clients playing the game

Summary of their clients

Summary of the teams that they are supporting

Community

This site component permits users to form communities. Visitors (unregistered users) to the site can play games without registration. Registration is required save results, create profile and enter contests. Visitors can travel through the My Dream House map click on anyone's Dream Home and look at the public elements. Data feeds into My Dream House will include weather, recreation events and other elements that give users a feel for what it is like to live somewhere. To leave comments, add to their friends list or clone elements the user must be registered.

Leagues

In one embodiment, games support the notion of leagues where groups of players are in a specific league and only compete against each other. Leagues require a "commissioner" role which can control all aspects of the league, including inviting or banning players. Leagues require private message boards, chat capabilities, and game management (length of league, eligible properties, etc.). Leagues may include professional leagues for real estate agents. The professional league will be sponsored by a given brokerage in a given metro area.

Other System Components

The following components provide information to or from the various applications or games, or are website components that permit players to play the various games.

Prizing

In this site component, weekly and monthly prizes are set. All players are registered to win based on performance in the games. It will be easy for someone to get entered into the prize drawing. Prizes may, for example, relate to real estate, remodeling, landscaping, in addition to gift certificates and iPods.

Data Feeds

In this site component, data is presented from one or more data feeds. The data feeds may include, but are not limited to:

IHomefinder—MLS listings. See, for example, http://www.ihomefinder.com.

Zillow.com—public record data. See, for example, http://www.zillow.com.

First American Data—public record data. See, for example, http://www.firstamres.com/

Listings

This may include information from Multiple Listing Service (MLS)/Internet Data Display (IDX), Trulia, Google Base, Craig's List feeds, other syndication services (Oddle, Postlets, etc.) or be user generated.

Property Information

This may include information property and AVM data from third party vendors including, but not limited to, Onboard LLC, Dataquick, First American, Propertyshark, Zillow and/or Fidelity. Property information includes, but is not limited to number of beds, baths, building size, lot size, construction type, and other amenities (pool, garage, etc.).

Product Information

This may include information from third party vendors in selected industries such as Expedia for travel and accommodations data, Sotheby's for art data and photos, etc.

Sales Data

This may include information on properties sold.

Demographic Data

These feeds may include data from dataplace.org, the US Census, and/or Onboard LLC or other public sources.

Photo Image

There feeds may include images from IDX, user generated images and/or Flickr (www.flickr.com).

Maps

This site component includes, but is not limited to, street map and or satellite images and may include push pins to locate properties, labels for areas and/or shape files for neighborhoods, zip, etc.

Application Databases

This site component manages data and logic in support of the applications. Examples of managed data and logic include, but are not limited to, tracking user transactions, storing payer profile components, managing the money supply and transactions in MLI, providing, receiving and/or storing games and application data, managing prizes, and offloading player transactions for later analysis. This information is generally not available to the players. Examples include, but are not limited to database D, 300, 400, or 500.

Thus it is intended that the scope of the invention herein disclosed should not be limited by the particular disclosed embodiments described below. In any method or process disclosed herein, the acts or operations making up the method/process may be performed, for example, in any suitable sequence and on any number of networked computers, and are not necessarily limited to any particularly disclosed embodiment. For purposes of contrasting various embodiments with the prior art, certain aspects and advantages of these embodiments are described where appropriate herein. Of course, it is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

One embodiment of each of the methods described herein is in the form of a computer program that executes on a processing system, e.g., a one or more processors. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

In another embodiment, some or all of the website 600 is sponsored, and the website may include access to co-branded pages that look and feel like those of the sponsoring companies. Selected applications will include a distributed deployment strategy, in which the applications may reside on other sites throughout the Internet, including blogs, major portals, real estate brokerages, financial services, home furnishings, and consumer products sites.

We claim:

1. A game for one or more players, where said game is based on the simulation of a value of a specific high-value asset (HVA) selected from a plurality of HVAs, said game comprising:

a processor; and a memory device storing a plurality of instructions, which when executed by said processor, causes said processor to determine the value of the specific HVA with a valuation model based on the value of HVAs including HVAs other than the specific HVA;

accept a guess of the value from a first player of said one or more players;

calculate a score corresponding to the deviation of said guess from the value; and store prior play information related to specific previous plays of said game, where said prior play information includes a player identification, the HVA, and two or more of the value, guess, or score, and where said valuation model provides the value of the specific HVA that depends on said prior play information, where said plurality of instructions, which when executed by said processor, causes said processor to determine the value of the specific HVA with said valuation model by having said processor;

establish a first subset of HVAs having a proximity to the specific HVA;

identify a first set of individual plays having the HVA within said first subset of HVAs;

determine an authority for each player identified in said first set of individual plays;

identify a second set of individual plays having the HVA identical with the specific HVA; and determine the value of the specific HVA from a weighted average from said guesses of said second set of individual plays and said authority corresponding to the player of said individual plays.

2. An apparatus for playing a game for one or more players, where said game is based on the simulation of a value of a specific high-value asset (HVA), the apparatus comprising:
   a processor; and
   a memory device storing a plurality of instructions, which when executed by said processor, causes said processor to:
      determine a value of the specific HVA based on the value of HVAs including HVAs other than the specific HVA, where the specific HVA is a first HVA of a plurality of HVAs;
      accept a guess of said value from a first player of said one or more players;
      calculate a score corresponding to the deviation of said guess from said value; and
      store prior play information related to specific previous plays of said game,
   where said plurality of instructions, which when executed by said processor, causes said processor to determine a value of the specific HVA with a valuation model,
   where said prior play information includes a player identification, the HVA, and two or more of the value, guess, or score,
   where said value is calculated from the stored prior play information,
   wherein said plurality of instructions, when executed by said processor, causes said processor to determine a value of the specific HVA by having said processor:
      establish a first subset of HVAs having a proximity to the specific HVA;
      identify a first set of individual plays having the HVA within said first subset of HVAs;
      determine an authority for each player identified in said first set of individual plays;
      identify a second set of individual plays having the HVA identical with the specific HVA; and
      determine said value of the specific HVA from a weighted average from said guesses of said second set of individual plays and said authority corresponding to the player of said prior plays.

3. The apparatus of claim 2, wherein said plurality of instructions, when executed by said processor, causes said processor to:
   provide said score to said first player.

4. The apparatus of claim 2, where the value is a sale price or valuation.

5. The apparatus of claim 4, wherein said plurality of instructions, when executed by said processor, causes said processor to obtain information related to the sales price or valuation of the HVA.

6. The apparatus of claim 2, where the specific HVA is a first HVA of a plurality of HVAs, where each of said plurality of HVAs has corresponding characteristics and value, and where said valuation model estimates said value of the specific HVA from the value of said plurality of HVAs having similar characteristics as the specific HVA.

7. The apparatus of claim 6, wherein said plurality of instructions, when executed by said processor, causes said processor to obtain information related to the characteristics and value of the plurality of HVAs.

8. The apparatus of claim 2, said plurality of instructions, which when executed by said processor, causes said processor to determine a value of the specific HVA using an Automated Valuation Model.

9. The apparatus of claim 2, where said HVA is selected from the group comprising real estate, home furnishings, travel, fashion, automobiles, collectibles, and art.

10. The apparatus of claim 2, where said game is played over a computer network.

11. A game for one or more players, where said game is based on the simulation of the value of high-value assets (HVAs), said game comprising:
   a processor; and
   a memory device storing a plurality of instructions, which when executed by said processor, causes said processor to:
      determine a value of a specific HVA using a valuation model based on the value of HVAs including HVAs other than the specific HVA, where the specific HVA is a first HVA of a plurality of HVAs;
      accept a guess of said value of the specific HVA from a first player of said one or more players;
      calculate a score corresponding to the deviation of said guess from said value; and
      store prior play information related to specific previous plays of said game, where said prior play information includes a player identification, the HVA, and two or more of the value, guess, or score,
   where said value is calculated from the stored prior play information,
   where said plurality of instructions, when executed by said processor, causes said processor to determine the value of the specific HVA by having said processor:
      establish a first subset of HVAs having a proximity to the specific HVA;
      identify a first set of individual plays having the HVA within said first subset of HVAs;
      determine an authority for each player identified in said first set of individual plays;
      identify a second set of individual plays having the HVA identical with the specific HVA; and
      determine said value of the specific HVA from a weighted average from said guesses of said second set of individual plays and said authority corresponding to the player of said prior plays.

12. The game of claim 11, wherein said plurality of instructions, when executed by said processor, causes said processor to
   provide said score to said first player.

13. The game of claim 11, where the value is a sale price or valuation.

14. The game of claim 13, wherein said plurality of instructions, when executed by said processor, causes said processor to obtain information related to the sales price or valuation of the specific HVA.

15. The game of claim 11, where the specific HVA is a first HVA of a plurality of HVAs, where each of said plurality of HVAs has corresponding characteristics and value, and where said valuation model estimates said value of the specific HVA from the value of said plurality of HVAs having similar characteristics as the specific HVA.

16. The game of claim 15, wherein said plurality of instructions, when executed by said processor, causes said processor to obtain information related to the characteristics and value of the plurality of HVAs.

17. The game of claim 11, where said valuation model is an Automated Valuation Model.

18. The game of claim 11, where said HVA is selected from the group comprising real estate, home furnishings, travel, fashion, automobiles, collectibles, and art.

19. The game of claim 11, where said game is played over a computer network.

* * * * *